2,957,847

BLENDS OF STYRENE/ACRYLONITRILE COPOLYMERS WITH ETHYLENE/VINYLENE CARBONATE COPOLYMERS

Ival O. Salyer and James A. Herbig, Dayton, Ohio, assignors to Monsanto Chemical Company, St. Louis, Mo., a corporation of Delaware No Drawing. Filed Dec. 11, 1953, Ser. No. 397,794

7 Claims. (Cl. 260—45.5)

This invention relates to styrene/acrylonitrile copolymers. In some of its aspects the invention relates to such copolymers having improved properties by virtue of incorporation therein of an ethylene/vinylene carbonate copolymer. In other aspects the invention pertains to methods of increasing the toughness of styrene/acrylonitrile copolymers.

Copolymers of styrene with acrylonitrile, especially those containing from 90 to 60 parts by weight styrene and from 10 to 40 parts by weight acrylonitrile, constitute an important class of commercial resins. Probably their principal use is as injection molding material. Such copolymers have better resistance to certain solvents, e.g., kerosene, than polystyrene per se. Styrene/acrylonitrile copolymers can be blended with butadiene/acrylonitrile synthetic rubbers to give a product that can be extruded into sheets, which are then formed as desired. Styrene/acrylonitrile copolymers are finding increased use in latex paints.

Styrene/acrylonitrile copolymers of the type described have very limited flexibility. They are comparatively brittle materials which do not show a definite tensile yield point. Their tensile elongation is of the order of only a few percent, and the flexural deflection is quite small. The properties just mentioned constitute some of the measures of the toughness of a resin. While plasticizers of various types can be added, they give a lower heat distortion point or softening point which for many uses is very undesirable. Of course, plasticizers tend to exude after a period of time. Some of the physical properties of styrene/acrylonitrile copolymers can be improved by incorporating therewith rubbery materials. However the unsaturation of such materials tends to lower the age resistance of the resulting polymer blends. Furthermore, in incorporating any resinous material in styrene/acrylonitrile copolymers, problems of compatibility arise. If the added material is too incompatible with the styrene/acrylonitrile copolymer, not only the appearance but the physical properties of the resulting blend make it unfit for practical use.

In accordance with the present invention in preferred aspects, styrene/acrylonitrile copolymers comprising from 90 to 60 parts by weight styrene and from 10 to 40 parts by weight acrylonitrile and which are high molecular weight solid resinous materials, are blended with ethylene/vinylene carbonate copolymers. Copolymers of ethylene with vinylene carbonate are new materials, and are described in detail in the copending application of Earl W. Gluesenkamp and John D. Calfee, Serial No. 355,859, filed May 18, 1953, now Patent No. 2,847,398, the contents of which application are incorporated herein by reference. A blend of styrene/acrylonitrile copolymer with an ethylene-vinylene carbonate copolymer shows, when injection molded, a definite tensile yield point and its tensile elongation is very markedly increased over that of the styrene/acrylonitrile copolymer itself. Further, the flexural deflection is improved, especially so when the material is compression molded. These effects with resulting improved toughness are achieved without the marked lowering of softening point or heat distortion point which results on blending the styrene/acrylonitrile copolymer with the usual low molecular weight liquid plasticizers. While polyethylene is hardly at all compatible with styrene/acrylonitrile copolymers, ethylene/vinylene carbonate copolymer, although resembling polyethylene in many ways, is much more compatible with styrene/acrylonitrile copolymer.

While this invention is directed particularly to the copolymers of styrene with acrylonitrile wherein styrene and acrylonitrile are the sole monomers subjected to copolymerization, it is permissible and not outside the broad scope of the invention to have other polymerizable unsaturated comonomers present during the polymerization in amounts preferably not to exceed 15 weight percent of total monomers, provided such comonomer, for example $\alpha$-methylstyrene, vinyltoluene, methyl acrylate, butyl acrylate, methyl methacrylate, is not of such nature or of such quantity as to affect adversely the desired characteristics of the resulting styrene/acrylonitrile copolymer product. In any event, the polymer should have high molecular weight suitable for the use intended, i.e., suitable for a useful injection molded or compression molded article, sheet, or other structure.

The term "blend" is used herein in a broad sense to include both mechanical blends of preformed styrene/acrylonitrile copolymers with preformed ethylene/vinylene carbonate copolymers, and blends prepared by polymerizing a monomeric material comprising styrene and acrylonitrile in the presence of preformed ethylene/vinylene carbonate copolymers. Thus, styrene/acrylonitrile copolymer and ethylene/vinylene carbonate copolymer can be brought together into intimate admixture by any suitable mechanical means, such as by milling on cold or heated mill rolls, mixing in a Banbury mixer, solution in a common solvent, or mixing emulsions, suspensions, or dispersions of the two polymers and coagulating same. On the other hand, an ethylene/vinylene carbonate copolymer can be incorporated in a monomeric material consisting of styrene and acrylonitrile or comprising styrene and acrylonitrile with one or more other comonomers in proportions described hereinabove, and the resulting material subjected to polymerization. For best results said polymerization should be carried to a high conversion, such as greater than 95 percent conversion to high molecular weight styrene/acrylonitrile copolymer. In preparing such a "polymerization blend," the ethylene-vinylene carbonate copolymer should be thoroughly and intimately dispersed in the monomeric material prior to polymerization.

Styrene/acrylonitrile copolymer, as described herein, can be made by any of the known styrene/acrylonitrile copolymerization techniques from monomeric material comprising styrene and acrylonitrile, either with or without ethylene/vinylene carbonate copolymer present. One of the most common of said techniques is mass polymerization wherein the only material present in the reaction mixture is the monomers plus any catalyst and any modifier that may be used to affect the molecular weight, plus ethylene/vinylene carbonate copolymer if it is to be incorporated during the polymerization, and no added solvent or other reaction medium is present. Suitable catalysts are those that promote free radicals, e.g., peroxy-type and azo-type catalysts. By way of example are benzoyl peroxide, diacetyl peroxide, dimethylphenyl hydroperoxymethane, $\alpha,\alpha'$-azo-bis-isobutyronitrile. Solvent polymerization is similar to mass polymerization, except that a solvent for the monomers and/or polymer is also present during the polymerization. Use of a solvent usually results in a lower molecular weight polymer. The copolymerization of styrene and acrylonitrile, with or without other comonomer, can also be effected advantageously by suspension or emulsion techniques. Both of these techniques involve the use of a non-solvent for the monomer and polymer, but in the suspension technique the particles of monomer and ultimately of the polymer are comparatively large, while in the emulsion procedure the particles are quite small and the final product is a stable latex. For suspension polymerization, a reaction medium such as water is used together with a small amount of a suspending agent, for example tricalcium phosphate, a vinyl acetate-maleic anhydride copolymer product, etc., to give a suspension of particles of initial reaction mixture which are not of sufficiently small size as to result in a permanently stable latex as a final product. To effect emulsion polymerization, sufficient amount of emulsifying agent, for example a water-soluble salt of a sulfonated long chain alkyl aromatic compound, is employed in suitable quantity along with vigorous agitation whereby an emulsion of the reactants in water is formed and the product is obtained in the form of a latex. The latex can then be coagulated if desired by known methods and the polymer separated from the water. In those embodiments of the invention wherein styrene and acrylonitrile are copolymerized in the presence of preformed ethylene/vinylene carbonate copolymer, the presence of dissolved or suspended ethylene/vinylene carbonate in the monomers may tend to make it more difficult to form an emulsion than in the case of the monomers alone. However, the emulsion technique has certain advantages particularly in that a very rapid and complete conversion to high molecular weight is obtained. Conventional recipes and procedures for effecting mass, suspension and emulsion copolymerization of styrene with acrylonitrile are so well known to those skilled in the art that they need not be reiterated here. Emulsion and suspension polymerization can be effected at temperatures which are chosen in accordance with the catalyst system used but which may for example be from 50° C. to 100° C. Mass polymerization is usually most advantageously effected at temperatures within the range of 25° C. to 125° C.

It is believed highly probable that in the practice of those embodiments of this invention wherein preformed ethylene/vinylene carbonate copolymer is present during the copolymerization of styrene with acrylonitrile, a certain amount of interpolymerization occurs between styrene and acrylonitrile molecules on the one hand and ethylene/vinylene carbonate copolymer molecules on the other hand, with the resultant formation of what can be called a "graft" polymer, although it is by no means certain and is even doubtful that all molecules of ethylene/vinylene carbonate copolymer become united with one or more styrene and/or acrylonitrile monomer units. However, the invention is not to be limited by any theroy of particular reaction mechanism.

The materials blended with styrene/acrylonitrile copolymer in the practice of the present invention are copolymers of ethylene with vinylene carbonate. Properties of vinylene carbonate and methods of preparing same are described by Newman and Addor, Jour. Amerc. Chem. Soc., 75, 1263, March 5, 1953. Vinylene carbonate has the structural formula:

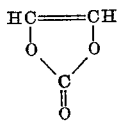

A suitable method of preparing vinylene carbonate is chlorination of ethylene carbonate to form monochloroethylene carbonate, followed by dehydrochlorination of the latter by reaction with an amine, resulting in vinylene carbonate.

The invention encompasses blends of styrene/acrylonitrile copolymers with ethylene/vinylene carbonate copolymers containing ethylene and vinylene carbonate in all proportions. Most ethylene/vinylene carbonate copolymers will contain from 5 weight percent to 99 weight percent ethylene and from 95 weight percent to 1 weight percent vinylene carbonate, based upon the combined weights of the monomers entering into the copolymer. In its broadest aspects the invention contemplates use of polymers of ethylene containing the smallest significant quantity of vinylene carbonate, which may be 1 weight percent or less, and at the other extreme, the use of polymers of vinylene carbonate containing the smallest significant quantity of ethylene which may be 1 weight percent or less, and all proportions between those extremes. However, of particular interest are ethylene/vinylene carbonate copolymers containing a major proportion by weight of ethylene and a minor proportion by weight of vinylene carbonate combined in the copolymeric material. Copolymer compositions within the range of ethylene:vinylene carbonate weight proportions of 99:1 to 70:30 are ordinarily most useful in the practice of the invention. It is often preferred to prepare copolymers by polymerization of monomeric material comprising ethylene and vinylene carbonate, containing a sufficiently high proportion of ethylene to produce a polyethylene-like material, i.e., a high molecular weight normally solid polymer having the general properties of polyethylene per se, i.e., polyethylene prepared from monomeric material consisting of ethylene.

Any suitable combination of polymerization conditions resulting in the formation a copolymer from a monomeric material comprising ethylene and vinylene carbonate can be employed. However, in preferred embodiments a monomeric material comprising ethylene and vinylene carbonate is subjected to copolymerization at high pressures, preferably at least 5000 pounds per square inch. Pressures of at least 15,000 pounds per square inch are more preferably employed, resulting in a product having high self-compatibility (homogeneity). Often optimum results are obtained at pressures within the range of 20,000 to 40,000 pounds per square inch. There is no particular upper pressure limit except that imposed by equipment limitations and pressures up to 200,000 pounds per square inch and even higher are suitable. It will be understood that suitable precautions should be observed in effecting this polymerization process, including the use of rupture discs, barriers, and other well-known means for carrying out high pressure reactions with safety. It is possible to have a combination of reaction conditions resulting in an explosive reaction, and this should be guarded against by known means. However, technical facilities for the commercial use of high pressures have been adequately developed, and therefore the high pressures employed are no barriers to commercial use of the high pressure copolymerization process. The copolymerization is preferably carried out at temperatures within a fairly broad range, which is preferably 35° C. to 125° C. The preferred range is 50° C. to 100° C.

The invention in its broadest aspects is not departed from by blending styrene/acrylonitrile copolymers with ethylene/vinylene carbonate copolymers made by providing, in addition to ethylene and vinylene carbonate, other monomeric materials capable of entering into the polymerization reaction. Thus, vinyl chloride, vinyl acetate, vinyl fluoride, propylene, styrene, acrylonitrile, and other unsaturated organic compounds can be used as comonomers along with the ethylene and vinylene carbonate. This of course will affect the polymer properties but the amount can be chosen so as to retain the advantageous results of the copolymerization of vinylene carbonate with ethylene.

In copolymerizing ethylene with vinylene carbonate it is preferred to employ catalysts of the free-radical promoting type, principal among which are peroxide-type polymerization catalysts and azo-type polymerization catalysts, e.g., diacetyl peroxide, dimethylphenylhydroperoxymethane, diazoaminobenzene, in small but catalytic amounts usually within the range of 0.001 to 0.5 percent by weight of the comonomers. The ethylene/vinylene carbonate copolymerization can be effected in the presence of catalytic amounts of oxygen, as within the range of 10 to 200 parts oxygen per million parts monomeric material on the weight basis. The copolymerization can also be effected under the influence of ionizing radiation of polymerizing intensity, such as provided by cobalt-60 or other radioactive substances, using the general procedures described and claimed in the copending application of William H. Yanko and John D. Calfee, Serial No. 318,098, filed October 31, 1952. Copolymers of ethylene and vinylene carbonate employed in accordance with the present invention are inclusive of modified polymeric materials known as telomers, obtained by carrying out the copolymerization in the presence of materials which are non-polymerizable under the conditions employed but which combine with a plurality of units of the monomers, e.g., carbon tetrachloride, organic acids, esters, mercaptans, alcohols, etc. Additional details directed to the preparation of ethylene/vinylene carbonate copolymers, which can be used in the present invention, will be found in the above-mentioned copending application of Earl W. Gluesenkamp and John D. Calfee, Serial No. 355,859, filed May 18, 1953, now Patent No. 2,847,398.

Vinylene carbonate units in the ethylene/vinylene carbonate copolymers are subject to hydrolysis, whereby part or all of said units are converted to units of the following type in the polymer:

The present invention includes blends of styrene/acrylonitrile copolymers with ethylene/vinylene carbonate copolymers that have undergone hydrolysis, and even that subsequent to hydrolysis have been subjected to further treatment to react other materials with part or all of the hydroxy groups, e.g., with aldehydes to produce acetals.

Only small quantities of the ethylene/vinylene carbonate copolymer need be used. Less than 5 weight percent of the said copolymer, based upon the combined weight of styrene/acrylonitrile copolymer plus ethylene/vinylene carbonate copolymer, is sufficient to improve significantly the toughness of the styrene/acrylonitrile copolymer. However, quantities from 1 to 50 weight percent and especially from 1 to 30 weight percent ethylene/vinylene carbonate copolymer, can be used to distinct advantage. The quantity of ethylene/vinylene carbonate copolymer to be used for optimum results will, of course, be dependent to a considerable extent upon the general characteristics of the ethylene/vinylene carbonate copolymer as well as on the conditions employed in effecting the copolymerization of styrene with acrylonitrile. In general, the higher the vinylene carbonate content of the ethylene/vinylene carbonate copolymer, the more compatible it is with the styrene/acrylonitrile copolymer, and hence the more of the former that can be used in the blends. In any event, sufficient ethylene/vinylene carbonate copolymer is used to increase the tensile elongation and/or flexural deflection of the styrene/acrylonitrile copolymer with which the ethylene/vinylene carbonate copolymer is blended either mechanically or by being present during the polymerization of the styrene/acrylonitrile monomeric mixture.

The styrene/acrylonitrile-type resins containing ethylene/vinylene carbonate copolymer, prepared as described herein, can also have included therein additional materials, such as plasticizers, stabilizers, fillers, dyes, pigments, other polymers and the like. These materials can be added to preformed styrene/acrylonitrile copolymer and/or preformed ethylene/vinylene carbonate copolymer, as by milling together or otherwise mixing the added materials with the polymers, or can be similarly added to the blends of styrene/acrylonitrile copolymer with ethylene/vinylene carbonate copolymer, or can be present during the polymerization resulting in the production of either of the copolymers employed in the present invention or during the polymerization of styrene/acrylonitrile monomers containing preformed ethylene/vinylene carbonate copolymer, provided such presence does not adversely affect the polymerization process or the product to an undesirable extent.

The products of the present invention can be subjected to injection or compression molding and other operations which are standard for styrene/acrylonitrile copolymers. The products can be used to make molded structures, or plastic sheets suitable for cutting or otherwise converting to an intended use. Although it might be expected, because of the presence of vinylene carbonate units in the polymeric material, that the products would be somewhat more sensitive to heat than styrene/acrylonitrile copolymer per se, no evidence of decomposition was noted during molding at normal processing temperatures.

Polyethylene is quite incompatible with styrene/acrylonitrile copolymer, as evidenced by the fact that a blend of only 2.5 weight percent polyethylene in styrene/acrylonitrile copolymer results in a product which is cheesy and brittle. Ethylene/vinylene carbonate copolymers are much more compatible with the styrene/acrylonitrile copolymers. Such compatibility is limited in that the products of the invention are translucent at low concentrations of ethylene/vinylene carbonate copolymer and become more opaque as the concentration of ethylene/vinylene carbonate copolymer is increased. As indicated hereinbefore, increasing the proportion of vinylene carbonate in the ethylene/vinylene carbonate copolymer increases the compatibility of said copolymer with the styrene/acrylonitrile copolymer.

The following examples provide details of certain preferred embodiments of the invention. The data are to be taken as exemplary, and the invention in its broadest aspects is not limited to the particular conditions, proportions, and materials set forth therein.

EXAMPLE 1

The ethylene/vinylene carbonate copolymer employed in the tests described in the examples below was prepared as follows:

A mixture of ethylene and vinylene carbonate monomers (5 to 1 weight ratio) was polymerized at 20,000 pounds per square inch with $\alpha,\alpha'$-azodiisobutyronitrile catalyst. The bomb was charged with the monomer mixture at $-78°$ C., and while the mixture was still cold it was pressured to 6000 pounds per square inch with water. As the temperature rose to about 80° C., the pressure reached a maximum of 22,000 pounds per square inch. Under these conditions rapid polymerization occurred (1.75 hours) and the pressure dropped to 12,000 pounds per square inch. The copolymer was formed in 25 percent yield. It was found by direct oxygen analysis to contain 10.7 weight percent vinylene carbonate units in the copolymer.

The ethylene/vinylene carbonate copolymer had the following properties:

Tensile strength at break, p.s.i. _____ 2229.
Tensile elongation at break, percent __ 470.
Clash-Berg data:
    $T_f$ (° C.) _____ $-24$.
    $T_{2000}$ (° C.) _____ 82.
    Stifflex range (° C.) _____ 106.
Approximate molecular weight
  (by melt viscosity) _____ 19,000.
Appearance _____ Almost clear
                                        (slightly hazy).
Density _____ 0.96.

EXAMPLE 2

Commercial styrene/acrylonitrile copolymer containing 72 weight percent styrene and 28 weight percent acrylonitrile was used in the following test. This commercial styrene/acrylonitrile copolymer had an alcohol solubles content of 0.19 percent, heat distortion temperature of 97.5° C., and specific viscosity of 0.088 in a 0.1 percent solution in dimethylformamide at 25° C.

An intimate blend of 97.5 parts by weight of the commercial styrene/acrylonitrile resin described in the preceding paragraph with 2.5 parts by weight of the ethylene/vinylene carbonate copolymer prepared as described in Example 1, was made as follows: The styrene/acrylonitrile copolymer resin was colloided for about two minutes on hot (170° C.) 3 x 8" Thropp mill rolls. After a smooth rolling "bank" had been formed, the ethylene/vinylene carbonate copolymer was added and thoroughly homogenized by intensive hot milling for five minutes. The sheets were then stripped from the rolls, ground in an Abbe cutter, and test specimens molded in conventional manner.

Injection molded test samples of the commercial styrene/acrylonitrile resin, and of the blend of the resin and the ethylene/vinylene carbonate copolymer, were made and the properties set forth in Table I determined by standard ASTM plastics tests procedures.

*Table I*
INJECTION MOLDED MATERIALS

| Composition | Notched Impact Strength, ft.lbs./in. | Tensile Properties | | | | Flexural Properties, Break | |
|---|---|---|---|---|---|---|---|
| | | Yield | | Break | | | |
| | | p.s.i. | Percent Elongation | p.s.i. | Percent Elongation | p.s.i. | Defl. (in.) |
| Styrene/acrylonitrile | 0.53 | | | 11,400 | 1.8 | 18,374 | 0.24 |
| (97.5 Styrene acrylonitrile—) (2.5 ethylene/vinylene) carbonate | 0.61 | 10,479 | 9.0 | 7,700 | 29.6 | 18,991 | 0.31 |

The data in Table I show the remarkable effect on the properties of the styrene/acrylonitrile copolymer produced by only 2.5 weight percent ethylene/vinylene carbonate copolymer. The greatest change is in the tensile properties. While the styrene/acrylonitrile copolymer alone had no yield point, the blend showed a definite yield, at which point its strength was 10,479 pounds per square inch and the percent elongation was 9.0. This strength is only slightly below the ultimate strength of the styrene/acrylonitrile per se, and the elongation is 5 times as great as the ultimate elongation of the styrene/acrylonitrile material. The 29.6 percent tensile elongation at break for the blend is tremendously greater than the tensile elongation at break for the styrene/acrylonitrile copolymer alone. Additionally, the flexural deflection for the blend is significantly greater than the flexural deflection for the styrene/acrylonitrile copolymer alone. Furthermore, an improvement in the notched impact strength is exhibited by the blend.

EXAMPLE 3

An intimate blend of the commercial styrene/acrylonitrile resin and the ethylene/vinylene carbonate copolymer described in the preceding examples was prepared in the same manner as described in Example 2, with the exception that the blend contained 90 parts by weight of the styrene/acrylonitrile resin and 10 parts by weight of the ethylene/vinylene carbonate copolymer.

Compression molded test samples of the blend, and of the commercial styrene/acrylonitrile resin alone, were made and the properties set forth in Table II determined by standard ASTM plastics test procedures.

*Table II*
COMPRESSION MOLDED MATERIALS

| Composition | Tensile Properties, Break | | Flexural Properties, Break | |
|---|---|---|---|---|
| | p.s.i. | Percent Elongation | p.s.i. | Defl. (in.) |
| Styrene/acrylonitrile | 9,000 | 4.2 | 18,497 | 0.10 |
| (90.0 Styrene/acrylonitrile—) (10.0 Ethylene/vinylene) carbonate | 7,282 | 4.5 | 17,670 | >0.80 |

The data in Table II show that in the compression molded material, the ethylene/vinylene carbonate copolymer caused an increase in the flexural deflection from 0.1 inch to a value greater than the 0.80 inch limitation of the testing instrument. This very desirable increase in flexural deflection was obtained with very little decrease in flexural strength, only a small decrease in tensile strength, and with a very slight increase in tensile elongation.

While the invention has been described with particular reference to various preferred embodiments thereof, it will be appreciated that variations from the details given herein can be effected without departing from the invention in its broadest aspects.

We claim:
1. A blend of a styrene/acrylonitrile copolymer with an ethylene/vinylene carbonate copolymer.
2. A blend of a styrene/acrylonitrile copolymer with a normally solid polyethylene-like ethylene/vinylene carbonate copolymer containing a major proportion by weight of ethylene and a minor proportion by weight of vinylene carbonate in said copolymer.
3. An intimate admixture of from 99 to 70 parts by weight of a styrene/acrylonitrile copolymer containing from 60 to 90 parts by weight styrene and from 40 to 10 parts by weight acrylonitrile, with from 1 to 30 parts by weight of an ethylene/vinylene carbonate copolymer containing from 1 to 30 weight percent vinylene carbonate in said ethylene/vinylene copolymer.
4. A mechanical admixture of a preformed high molecular weight thermoplastic styrene/acrylonitrile copolymer containing from 60 to 90 parts by weight styrene and from 40 to 10 parts by weight acrylonitrile with a preformed ethylene/vinylene carbonate copolymer containing from 1 to 30 weight percent vinylene carbonate therein.
5. Styrene/acrylonitrile copolymer containing about 72 weight percent styrene and 28 weight percent acrylonitrile, intimately admixed with up to 5 weight percent based on the total admixture of an ethylene/vinylene carbonate copolymer comprising a major proportion by weight of ethylene and a minor proportion by weight of vinylene carbonate in said copolymer.

6. A blend according to claim 1 made by mechanically mixing preformed styrene/acrylonitrile copolymer and preformed ethylene/vinylene carbonate copolymer.

7. A blend according to claim 1 made by polymerizing a monomeric material comprising styrene and acrylonitrile containing preformed ethylene/vinylene carbonate copolymer.

References Cited in the file of this patent

UNITED STATES PATENTS

| | | |
|---|---|---|
| 2,563,771 | Adelson | Aug. 7, 1951 |
| 2,646,417 | Jennings | July 21, 1953 |